United States Patent
Gutowski et al.

(10) Patent No.: US 11,021,036 B2
(45) Date of Patent: Jun. 1, 2021

(54) BATTERY ELECTRIC VEHICLE AND METHOD TO COOL A HIGH VOLTAGE POWERTRAIN COMPONENT OF A BATTERY ELECTRIC VEHICLE

(71) Applicant: FORD GLOBAL TECHNOLOGIES, LLC, Dearborn, MI (US)

(72) Inventors: Alan Gutowski, Wixom, MI (US); Bradley Szkrybalo, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 16/375,074

(22) Filed: Apr. 4, 2019

(65) Prior Publication Data
US 2020/0317019 A1    Oct. 8, 2020

(51) Int. Cl.
*B60H 1/00*    (2006.01)
*B60H 1/32*    (2006.01)
(Continued)

(52) U.S. Cl.
CPC ..... *B60H 1/00271* (2013.01); *B60H 1/00392* (2013.01); *B60H 1/00764* (2013.01);
(Continued)

(58) Field of Classification Search
CPC ............ B60H 1/00271; B60H 1/00392; B60H 1/00764; B60H 1/00785; B60H 1/00885;
(Continued)

(56) References Cited

U.S. PATENT DOCUMENTS 6,077,158 A * 6/2000 Lake .................. B60H 1/00907
454/70
7,013,659 B2 * 3/2006 Yoshida ................ H01M 10/63
62/186
(Continued)

FOREIGN PATENT DOCUMENTS

CA          2943303 A1    9/2015
DE    102013203907 A1    9/2013
(Continued)

OTHER PUBLICATIONS

English Machine Translation of DE102013203907A1 dated Sep. 12, 2013.
(Continued)

*Primary Examiner* — Jon T. Schermerhorn, Jr.
(74) *Attorney, Agent, or Firm* — David Copiellie; Price Heneveld LLP

(57) ABSTRACT

A battery electric vehicle includes a passenger cabin, a refrigerant circuit adapted to cool the passenger cabin, a powertrain including a high voltage powertrain component, a coolant circuit adapted to cool the high voltage powertrain component and a control module. The refrigerant circuit includes a condenser and an evaporator. The coolant circuit includes a radiator downstream from the condenser. The control module is configured to recirculate cabin air to the passenger cabin in response to data indicating temperature of the high voltage powertrain component exceeds a predetermined threshold temperature in order to reduce the air outlet temperature at the condenser and the air inlet temperature at the radiator. A related method to cool a high voltage powertrain component of a battery electric vehicle is also disclosed.

17 Claims, 1 Drawing Sheet

(51) Int. Cl.
   *B60H 1/26* (2006.01)
   *B60L 50/60* (2019.01)

(52) U.S. Cl.
   CPC ..... *B60H 1/00785* (2013.01); *B60H 1/00885* (2013.01); *B60H 1/26* (2013.01); *B60H 1/323* (2013.01); *B60H 2001/00928* (2013.01); *B60H 2001/3266* (2013.01); *B60H 2001/3288* (2013.01); *B60L 50/60* (2019.02); *B60Y 2200/91* (2013.01); *B60Y 2306/05* (2013.01)

(58) Field of Classification Search
   CPC ............ B60H 1/26; B60H 2001/00928; B60H 2001/3266; B60H 2001/3288; B60L 50/60
   See application file for complete search history.

(56) References Cited

U.S. PATENT DOCUMENTS

| | | | |
|---|---|---|---|
| 9,649,908 B2 * | 5/2017 | Takeuchi | B60L 1/003 |
| 10,544,948 B2 * | 1/2020 | Kwon | F24F 3/1411 |
| 10,696,135 B2 * | 6/2020 | Ceperkovic | F25B 41/31 |
| 10,752,086 B2 * | 8/2020 | Srivastava | B60H 1/00807 |

FOREIGN PATENT DOCUMENTS

| | | |
|---|---|---|
| KR | 20110112586 A | 10/2011 |
| WO | 2013101519 A1 | 7/2013 |
| WO | 2013132756 A1 | 9/2013 |
| WO | 2017158991 A1 | 9/2017 |

OTHER PUBLICATIONS

English Machine Translation of KR20110112586A dated Oct. 13, 2011.

English Machine Translation of WO2013132756A1 dated Sep. 12, 2013.

English Machine Translation of WO2017158991A1 dated Sep. 21, 2017.

* cited by examiner

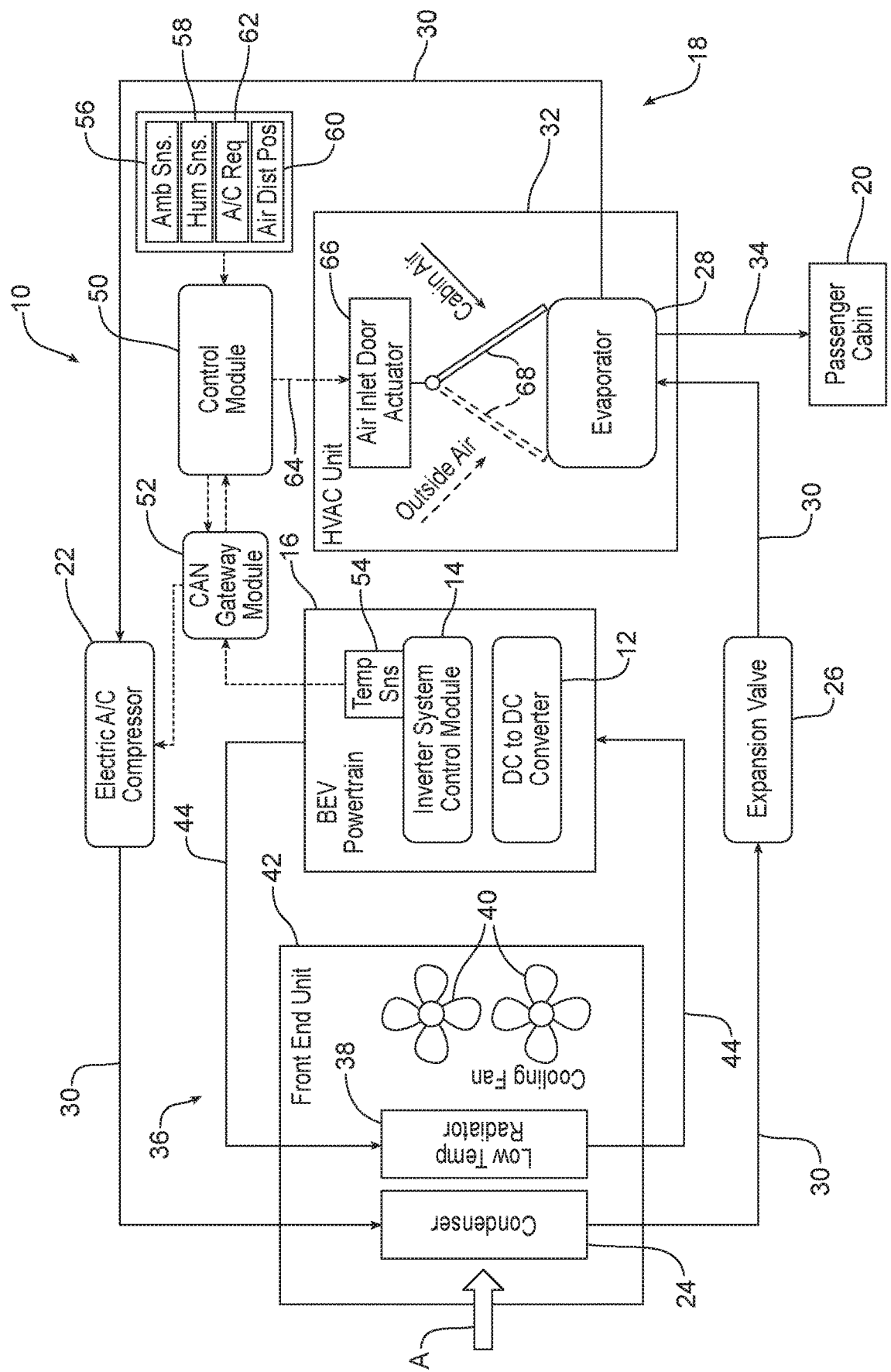

BATTERY ELECTRIC VEHICLE AND METHOD TO COOL A HIGH VOLTAGE POWERTRAIN COMPONENT OF A BATTERY ELECTRIC VEHICLE

TECHNICAL FIELD

This document relates generally to the field of battery electric vehicles and, more particularly, to a new and improved battery electric vehicle and a related method to cool a high voltage powertrain component of such a battery electric vehicle.

BACKGROUND

High voltage components including, particularly, high voltage powertrain components such as a DC to DC inverter and its inverter system control module produce substantial heat during operation of battery electric vehicles.

Currently, battery electric vehicles incorporate a low temperature radiator loop that provides cooling for the high voltage electronics. The low temperature radiator is positioned at the front end of the vehicle where it is cooled by ram air as the vehicle travels down the road. The low temperature radiator also is typically located downstream from the condenser of the vehicle heating ventilation and air conditioning (HVAC) system with respect to the ram air flow. The cooling efficiency of such an arrangement suffers when the front end airflow is compromised by low motor vehicle speeds or vehicle idle conditions or when operating in high ambient temperatures or under elevated sun loads.

This document relates to a battery electric vehicle and method to cool a high voltage powertrain component of such a vehicle and provides more effective and efficient cooling of the high voltage powertrain component without adding cost and complexity. Toward this end the temperature of the high voltage component is monitored via sensor and data respecting that temperature is communicated to a climate control module of the climate control system. Based upon the desired temperature threshold, the climate control module can override preferred operating parameters of the HVAC system to ensure the highest cooling efficiency for the high voltage powertrain component. More particularly, the climate control module can override control of the air inlet door to a recirculation position thereby ensuring that the evaporator temperature is set to its highest allowable value. This, in turn ensures the coldest condenser air out temperature and therefore the coldest air in temperature for the low temperature radiator in the coolant loop that provides coolant to the high voltage components.

SUMMARY

In accordance with the purposes and benefits described herein, a new and improved battery electric vehicle is provided. That battery electric vehicle comprises a passenger cabin for transporting vehicle occupants in comfort. The battery electric vehicle also includes a refrigerant circuit adapted to cool the passenger cabin. That refrigerant circuit includes a condenser and an evaporator.

The battery electric vehicle further includes a powertrain including a high voltage powertrain component as well as a coolant circuit adapted to cool the high voltage powertrain component. The coolant circuit includes a radiator for cooling the coolant with ambient air and particularly ram air as the battery electric vehicle travels along the roadway.

In addition, the battery electric vehicle includes a control module. That control module is configured to recirculate cabin air to the passenger cabin in response to data indicating a current temperature of the high voltage powertrain component exceeds a predetermined threshold temperature in order to reduce (a) an air outlet temperature at the condenser and (b) an air inlet temperature at the radiator.

The battery electric vehicle may further include a plurality of sensors including a high voltage powertrain component temperature sensor. The plurality of sensors may also include an ambient air temperature sensor. Further, the plurality of sensors may also include a relative humidity sensor.

In addition, the battery electric vehicle may further include an air distribution mode monitoring feature. The batter electric vehicle may also include an air conditioning status monitoring feature.

The battery electric vehicle may further include an inlet door displaceable between a first position providing fresh air and a second position recirculating cabin air to the passenger cabin. Still further, the battery electric vehicle may include an air inlet door actuator adapted to displace the air inlet door between the first position and the second position in response to the control module.

In one or more particularly useful embodiments of the battery electric vehicle, that control module may be configured to recirculate cabin air to the passenger cabin in order to reduce (a) the air outlet temperature at the condenser and (b) the air inlet temperature at the radiator when the air conditioning status monitoring feature indicates air conditioning is activated, the relative humidity sensor indicates current relative humidity less than a predetermined threshold relative humidity, the air distribution mode monitoring feature indicates panel related modes and the ambient temperature sensor indicates a current ambient air temperature above a predetermined ambient air temperature.

In accordance with an additional aspect, a new and improved method is provided to cool a high voltage powertrain component of a battery electric vehicle. That method comprises the steps of: (a) cooling a passenger cabin of the battery electric vehicle with refrigerant in a refrigerant circuit including a condenser, (b) cooling the high voltage powertrain component with a coolant in a coolant circuit including a radiator, (c) monitoring, by a high voltage powertrain component temperature sensor, a current temperature of the high voltage powertrain component and (d) reducing, by a control module, an air outlet temperature at the condenser and an air inlet temperature at the radiator by recirculating cabin air to the passenger cabin when the current temperature of the high voltage powertrain component exceeds a predetermined threshold temperature.

The method may further include the steps of monitoring by means of an air conditioning status monitoring feature, the current air conditioning status and recirculating cabin air when the current air conditioning is activated. Still further, the method may include the steps of monitoring, by an air distribution mode monitoring feature, the current air distribution mode of the HVAC system and recirculating cabin air when the air distribution mode monitoring feature indicates panel related modes.

Still further, the method may include the steps of monitoring, by an ambient air temperature sensor, the current ambient air temperature and recirculating cabin air when the ambient air temperature sensor indicates current ambient air temperature exceeding a predetermined ambient air temperature.

The method may also include the steps of monitoring, by a relative humidity sensor, the current relative humidity and recirculating cabin air when the current relative humidity detected by the relative humidity sensor is below a predetermined relative humidity. Still further, the method may include the steps of displacing, by the control module, an air inlet door from a first position providing fresh air to the passenger cabin to a second position recycling cabin air to the passenger cabin.

In accordance with yet another aspect, a method to cool a high voltage powertrain component of a battery electric vehicle comprises the steps of: (a) cooling a passenger cabin with refrigerant in a refrigerant circuit including a condenser, (b) cooling the high voltage powertrain component with a coolant in a coolant circuit including a radiator, (c) monitoring, by a high voltage powertrain component temperature sensor, a current temperature of the high voltage powertrain component and (d) reducing, by a control module, an air outlet temperature at the condenser and an air inlet temperature at the radiator by recirculating cabin air to the passenger cabin when the current temperature of the high voltage powertrain component exceeds a predetermined threshold temperature, a current relative humidity is below a predetermined relative humidity and a current ambient air temperature is above a predetermined ambient air temperature.

That method may also include the step of only recirculating cabin air to the passenger cabin when an air conditioning of the battery electric vehicle is activated and an air distribution mode of the battery electric vehicle is in a panel related mode.

In the following description, there are shown and described several preferred embodiments of the battery electric vehicle and the related method to cool a high voltage powertrain component of a battery electric vehicle. As it should be realized, the battery electric vehicle and method are capable of other, different embodiments and their several details are capable of modification in various, obvious aspects all without departing from the battery electric vehicle and method as set forth and described in the following claims. Accordingly, the drawings and descriptions should be regarded as illustrative in nature and not as restrictive.

BRIEF DESCRIPTION OF THE DRAWING FIGURE

The accompanying drawing FIGURE incorporated herein and forming a part of the specification, illustrates several aspects of the battery electric vehicle and method and together with the description serves to explain certain principles thereof.

FIG. 1 is a schematic block diagram of the relevant portions of the battery electric vehicle that function to perform the method to cool a high voltage powertrain component of that vehicle.

Reference will now be made in detail to the present preferred embodiments of the battery electric vehicle and the related method of cooling a high voltage powertrain component, examples of which are illustrated in the accompanying drawing FIGURE.

DETAILED DESCRIPTION

Reference is now made to FIG. 1 illustrating the operating systems of the battery electric vehicle 10 that are adapted or configured to cool a high voltage powertrain component, such as the DC to DC converter 12 and the inverter system control module 14 of the battery electric vehicle powertrain 16. For purposes of this document, the term "high voltage" refers to greater than 60 volts.

As illustrated, the battery electric vehicle 10 includes a refrigerant circuit, generally designated by reference numeral 18, that is adapted to cool the passenger cabin 20 of the battery electric vehicle 10. In the illustrated embodiment, that refrigerant circuit 18 includes an electric A/C compressor 22, a condenser 24, an expansion valve 26 and an evaporator 28. Refrigerant flows through the refrigerant circuit 18 in the manner and direction indicated by action arrows 30.

The refrigerant circuit 18 is adapted to cool the passenger cabin 20 of the battery electric vehicle 10 through operation of the HVAC unit 32. The HVAC unit 32 is of a type known in the art including a blower (not shown) for drawing fresh outside air or recirculating cabin air through the evaporator 28 where the airstream is conditioned by heat exchange with the cold refrigerant being circulated through the refrigerant circuit 18. The conditioned air is then forced by the blower through vents (not shown) into the passenger cabin 20 of the battery electric vehicle 10 (see action arrow 34).

As further illustrated in FIG. 1, the battery electric vehicle 10 also includes a coolant circuit generally designated by reference numeral 36. Coolant circuit 36 includes a low temperature radiator 38 and one or more cooling fans 40 provided on the front end unit 42 of the battery electric vehicle 10 with the condenser 24. Coolant is circulated through the coolant circuit 36 as indicated by action arrows 44 in order to cool the powertrain 16 including the DC to DC converter 12 and the inverter system control module 14. After providing this cooling function, the coolant is returned to the radiator 38 where it is cooled and then recycled back to the powertrain 16, the DC to DC converter 12 and the inverter system control module 14 to again provide more coolant. To save space at the front end unit 42, the low temperature radiator 38 may be provided partially or fully behind the condenser 24: that is, downstream of the condenser with respect to the ram air flow (note action arrow A) being forced into the front end of the vehicle 10.

The battery electric vehicle 10 also includes a control module 50. The control module 50 incorporates a computing device such as a dedicated microprocessor or an electronic control unit (ECU) operating in accordance with instructions from appropriate control software. Thus, the controller 50 may include one or more processors, one or more memories, and one or more network interfaces all in communication with each other over one or more communication buses.

In the illustrated embodiment, the control module 50 communicates through the CAN gateway module 52 with the electric A/C compressor 22 in the refrigerant circuit 18 and a high voltage powertrain component temperature sensor 54 that monitors the current temperature of one or more of the high voltage powertrain components including, for example, the DC to DC converter 12 and the inverter system control module 14. A data stream respecting the current temperature of the DC to DC converter 12 and/or inverter system control module 14 is sent from the temperature sensor 54 to the control module 50 through the CAN gateway module 52. Here, it should be appreciated that the temperature sensor 54 described herein may generally include one or more individual sensors as required for the indicated purpose.

As further illustrated in FIG. 1, the battery electric vehicle 10 also includes additional sensors including an ambient air temperature sensor 56 and a relative humidity sensor 58.

Thus, it should be appreciated that the illustrated embodiment includes a plurality of sensors including the high voltage powertrain component temperature sensor 54, the ambient air temperature sensor 56 and the relative humidity sensor 58.

Still further, the battery electric vehicle 10 also includes an air distribution mode monitoring feature 60 and an air conditioning status monitoring feature 62. The ambient air temperature sensor 56 may be of any type known in the art suited to provide current ambient temperature data to the control module 50. The relative humidity sensor 58 may be of any type known in the art suited to provide current relative humidity data to the control module 50. The air distribution mode monitoring feature 60 may be of any type known in the art suited to provide HVAC air distribution mode data to the control module 50. Such data includes, for example, where conditioned air is being directed in the motor vehicle including through the panel vents, the defrost vents or the floor vents. The air conditioning status monitoring feature 62 may be of substantially any type known in the art suited to provide air conditioning status and temperature request information to the control module 50.

As further illustrated in FIG. 1, the control module 50 is also connected by means of control lines 64 to an air inlet door actuator 66 that controls displacement of the air inlet door 68 between a first position illustrated in the full line in FIG. 1 providing outside or fresh air to the evaporator 28 and a second position, illustrated in phantom line in FIG. 1, recirculating cabin air to the evaporator 28 for circulation to the passenger cabin 20.

As will become more apparent from the following description, the control module 50 is configured to recirculate cabin air to the passenger cabin 20 in response to data indicating a current temperature of the high voltage power train component (e.g. the DC to DC converter 12 and/or the inverter system control module 14) exceeds a predetermined threshold temperature in order to reduce (a) an air outlet temperature at the condenser 24 and an air inlet temperature at the radiator 38 provided in the ambient airstream (note action arrow A) located at the front end unit 42 of the battery electric vehicle 10.

In one particularly useful embodiment, the control module 50 is configured to recirculate cabin air to the passenger cabin 20 in order to reduce (a) the air outlet temperature at the condenser 24 and (b) the air inlet temperature at the radiator 38 when the air conditioning status monitoring feature 62 indicates air conditioning is activated, the relative humidity sensor 58 indicates current relative humidity less than a predetermined threshold relative humidity, the air distribution monitoring feature 60 indicates current panel related modes and the ambient air temperature sensor 56 indicates a current ambient air temperature above a predetermined ambient air temperature.

Consistent with the above description, a method is provided to cool a high voltage powertrain component, such as the DC to DC converter 12 and/or the inverter system control module 14, of a battery electric vehicle 10. That method includes the steps of: (a) cooling the passenger cabin 20 with refrigerant in a refrigerant circuit 18 including a condenser 24, (b) cooling the high voltage powertrain component (DC to DC converter 12 and/or inverter system control module 14) with a coolant in a coolant circuit 36 including a radiator 38, (c) monitoring, by a high voltage powertrain component temperature sensor 54, a current temperature of the high voltage powertrain component (DC to DC converter 12 and/or inverter system control module 14) and (d) reducing, by the control module 50, an air outlet temperature at the condenser and an air inlet temperature at the radiator by recirculating cabin air to the passenger cabin 20 when the current temperature of the high voltage powertrain component exceeds a predetermined threshold temperature.

The method may also include a number of additional steps including but not necessarily limited to the following. In at least one of the many possible embodiments, the method also includes the steps of monitoring, by the air conditioning status monitoring feature 62, the current air conditioning status/operating condition of the HVAC unit 32 and recirculating cabin air when the current air conditioning status is "activated". In addition, the method may include the step of monitoring, by the air distribution mode monitoring feature 60, the current air distribution mode of the HVAC unit 32 and recirculating cabin air when the air distribution mode monitoring feature indicates a panel related mode.

In one or more of the many possible embodiments, the method may further include the steps of monitoring, by the ambient air temperature sensor 56 the current ambient air temperature and recirculating cabin air when the ambient air temperature sensor indicates a current ambient air temperature exceeding a predetermined ambient air temperature.

Still further, in one or more of the many possible embodiments, the method may include the steps of monitoring, by a relative humidity sensor 58, the current relative humidity and recirculating cabin air when the current relative humidity detected by the relative humidity sensor is below a predetermined relative humidity. In addition, the method may include the step of displacing, by the control module 50, an air inlet door 68 from a first position providing fresh air for conditioning and discharge into the passenger cabin 20 to a second position providing recycled cabin air for conditioning and discharge to the passenger cabin.

In one or more of the many possible embodiments, the method to cool a high voltage powertrain component, such as a DC to DC converter 12 and/or an inverter system control module 14, of a battery electric vehicle 10 comprises the steps of: (a) cooling a passenger cabin 20 with refrigerant in the refrigerant circuit 18 including a condenser 24, (b) cooling the high voltage powertrain component with a coolant in a coolant circuit 36 including a radiator 38, (c) monitoring, by a high voltage powertrain component temperature sensor 54, a current temperature of the high voltage powertrain component and (d) reducing, by the control module 50, an outlet air temperature at the condenser and an air inlet temperature at the radiator by recirculating cabin air to the passenger cabin when (a) the current temperature of the high voltage powertrain component exceeds a predetermined threshold temperature, (b) a current relative humidity is below a predetermined relative humidity and (c) a current ambient air temperature is above a predetermined ambient air temperature.

In at least one or more of the many possible embodiments, this method may further include the step of only recirculating cabin air to the passenger cabin when an air conditioning HVAC unit 32 of the battery electric vehicle 10 is activated and the air distribution mode of the battery electric vehicle is in a panel related mode.

For example, in one possible configuration, the control module 50 is configured to only recirculate cabin air through the air inlet door 68 to the evaporator 28 when the HVAC unit 32 is activated to provide air conditioning to the passenger cabin, a relative humidity sensor indicates a relative humidity of less than 30%, the air distribution mode monitoring feature 60 indicates a panel related mode (not defrost or floor mode), the ambient air temperature sensor indicates a temperature of greater than 28 degrees C., and the high voltage powertrain component temperature sensor 54 indicates a temperature of greater than or equal to imminent component failure (e.g. 105 degrees C.). Toward this end, the control module 50 sends a command to the air inlet door actuator 66 to displace the air inlet door 68 to the second position to allow only the entry of recirculated cabin air into the HVAC system intake. In addition, the control module sends a signal to set the evaporator temperature target to the maximum (e.g. 6.5 degrees C.) via control module command provided to the electric A/C compressor 22. This is done until the temperature of the high voltage powertrain component (DC to DC converter 12 and/or inverter system control module 14) is less than or equal to no imminent failure (e.g. 100 degrees C.).

By limiting operation of the HVAC unit 32 to only recirculate cabin air, the HVAC system works more efficiently and thus already conditioned vehicle cabin air is pushed through the evaporator 28 versus warmer or outside/fresh air. This functions to reduce the temperature of the refrigerant returned to the condenser 24 which reduces the air out temperature of the condenser. This in turn reduces the air in temperature at the radiator 38 which is located downstream from the condenser in the airstream A thereby increasing the efficiency of the cooling of the coolant 44 being returned to the DC to DC converter 12 and inverter system control module 14 at the powertrain 16. As a result, more efficient cooling of the DC to DC converter 12 and the inverter system control module 14 is provided.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A battery electric vehicle, comprising:
    a passenger cabin;
    a refrigerant circuit adapted to cool said passenger cabin, said refrigerant circuit including a condenser and an evaporator;
    a powertrain including a high voltage powertrain component;
    a coolant circuit adapted to cool said high voltage powertrain component, said coolant circuit including a radiator; and
    a control module configured to recirculate cabin air to said passenger cabin in response to data indicating a current temperature of said high voltage powertrain component exceeds a predetermined threshold temperature in order to reduce (a) an air outlet temperature at said condenser and (b) an air inlet temperature at said radiator.

2. The battery electric vehicle of claim 1, further including a plurality of sensors including a high voltage powertrain component temperature sensor.

3. The battery electric vehicle of claim 2, wherein said plurality of sensors includes an ambient air temperature sensor.

4. The battery electric vehicle of claim 3, wherein said plurality of sensors includes a relative humidity sensor.

5. The battery electric vehicle of claim 1, further including an air distribution mode monitoring feature.

6. The battery electric vehicle of claim 5, further including an air conditioning status monitoring feature.

7. The battery electric vehicle of claim 6, further including an air inlet door displaceable between a first position providing fresh air and a second position recirculating cabin air to said passenger cabin.

8. The battery electric vehicle of claim 7, further including an air inlet door actuator displacing said air inlet door between said first position and said second position in response to said control module.

9. The battery electric vehicle of claim 8, wherein said control module is configured to recirculate said cabin air to said passenger cabin in order to reduce (a) said air outlet temperature at said condenser and (b) said air inlet temperature at said radiator when said air conditioning status monitoring feature indicates air conditioning is activated, said relative humidity sensor indicates current relative humidity less than a predetermined threshold relative humidity, said air distribution mode monitoring feature indicates current panel related modes and said ambient air temperature sensor indicates a current ambient air temperature above a predetermined ambient air temperature.

10. A method to cool a high voltage powertrain component of a battery electric vehicle, comprising:
    cooling a passenger cabin with refrigerant in a refrigerant circuit including a condenser;
    cooling said high voltage powertrain component with a coolant in a coolant circuit including a radiator;
    monitoring, by a high voltage powertrain component temperature sensor, a current temperature of said high voltage powertrain component; and
    reducing, by control module, an air outlet temperature at said condenser and an air inlet temperature at said radiator by recirculating cabin air to said passenger cabin when said current temperature of said high voltage powertrain component exceeds a predetermined threshold temperature.

11. The method of claim 10, further including:
    monitoring, by air conditioning status monitoring feature, current air conditioning status; and
    recirculating cabin air when said current air conditioning status is activated.

12. The method of claim 10, further including:
    monitoring, by air distribution mode monitoring feature, current air distribution mode; and
    recirculating said cabin air when said air distribution mode monitoring feature indicates panel related modes.

13. The method of claim 10, further including:
    monitoring, by ambient air temperature sensor, current ambient air temperature; and
    recirculating said cabin air when said ambient air temperature sensor indicates current ambient air temperature exceeding a predetermined ambient air temperature.

14. The method of claim 10, further including:
    monitoring, by a relative humidity sensor, current relative humidity; and
    recirculating said cabin air when said current relative humidity detected by said relative humidity sensor is below a predetermined relative humidity.

15. The method of claim 10, further including displacing, by said control module, an air inlet door from a first position providing fresh air to said passenger cabin to a second position recycling said cabin air to said passenger cabin.

16. A method to cool a high voltage powertrain component of a battery electric vehicle, comprising:
    cooling a passenger cabin with refrigerant in a refrigerant circuit including a condenser;

cooling said high voltage powertrain component with a coolant in a coolant circuit including a radiator;

monitoring, by a high voltage powertrain component temperature sensor, a current temperature of said high voltage powertrain component; and reducing, by control module, an air outlet temperature at said condenser and an air inlet temperature at said radiator by recirculating cabin air to said passenger cabin when (a) said current temperature of said high voltage powertrain component exceeds a predetermined threshold temperature, (b) a current relative humidity is below a predetermined relative humidity and (c) a current ambient air temperature is above a predetermined ambient air temperature.

17. The method of claim 16, further including only recirculating said cabin air to said passenger cabin when an air conditioning of said battery electric vehicle is activated and an air distribution mode of said battery electric vehicle is in a panel related mode.

\* \* \* \* \*